(12) United States Patent
Neushul et al.

(10) Patent No.: US 10,900,997 B2
(45) Date of Patent: Jan. 26, 2021

(54) LOW DRIFT SYSTEM FOR A METROLOGY INSTRUMENT

(71) Applicant: Bruker Nano, Inc., Santa Barbara, CA (US)

(72) Inventors: Andrew Neushul, Goleta, CA (US); Anthonius Ruiter, Goleta, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 16/696,724

(22) Filed: Nov. 26, 2019

(65) Prior Publication Data

US 2020/0166540 A1 May 28, 2020

Related U.S. Application Data

(60) Provisional application No. 62/771,978, filed on Nov. 27, 2018, provisional application No. 62/771,473, filed on Nov. 26, 2018.

(51) Int. Cl.
| | | |
|---|---|---|
| *G01Q 30/10* | (2010.01) | |
| *G01Q 30/06* | (2010.01) | |
| *G01Q 20/02* | (2010.01) | |

(52) U.S. Cl.
CPC ............ *G01Q 30/10* (2013.01); *G01Q 30/06* (2013.01); *G01Q 20/02* (2013.01)

(58) Field of Classification Search
CPC ......... G01Q 30/10; G01Q 30/06; G01Q 20/02
See application file for complete search history.

(56) References Cited

U.S. PATENT DOCUMENTS

| | | |
|---|---|---|
| 5,654,546 A | 8/1997 | Lindsay |
| 9,110,092 B1 | 8/2015 | Magonov et al. |
| 2004/0026007 A1 | 2/2004 | Hubert et al. |
| 2015/0074859 A1 | 3/2015 | Ruiter et al. |

FOREIGN PATENT DOCUMENTS

JP  2011180126  9/2011

*Primary Examiner* — Nicole M Ippolito
*Assistant Examiner* — Hanway Chang
(74) *Attorney, Agent, or Firm* — Boyle Fredrickson S.C.

(57) ABSTRACT

The present inventors have recognized that more accurate measurements can be taken with less drift due to thermal expansion by precisely controlling insulated heating and cooling modules abutting one another in substantial alignment to rapidly heat a sample to be scanned by a Scanning Probe Microscope (SPM) with minimal temperature variation. The heating and cooling modules can be "flat-packed," with parallel surfaces of each module in contact with one another, to more efficiently heat a sample that is positioned in axial alignment with the heating and cooling modules. This can allow heating the sample to at least 250 degrees Celsius in less than 5 seconds, continuously maintaining a temperature of the sample to within ±0.001 degree Celsius, and maintaining a drift of less than 0.1 nanometers per minute in the z direction.

20 Claims, 13 Drawing Sheets

LOW DRIFT SYSTEM FOR A METROLOGY INSTRUMENT

CROSS-REFERENCE TO RELATED APPLICATIONS

This application claims priority under 35 USC § 1.119(e) to U.S. Provisional Patent Application No. 62/771,473, filed Nov. 26, 2018, and to U.S. Provisional Patent Application No. 62/771,978, filed Nov. 27, 2018. The subject matter of these applications is hereby incorporated by reference in their entirety.

FIELD OF THE INVENTION

The present invention relates generally to microscopy and, more particularly, to reducing drift in a scanning probe-based instrument, such as a scanning probe microscope (SPM), by simultaneously activating heating and cooling modules abutting one another in axial alignment to control a heat transfer to a sample to be scanned.

BACKGROUND OF THE INVENTION

Scanning Probe Microscopes (SPMs) are metrology instruments that provide high resolution information about the properties of surfaces. SPMs are commonly used for imaging, with some SPMs being able to image individual atoms. Along with images, SPMs can be used to measure a variety of surface properties, with detail over the range from a few angstroms to hundreds of microns. For many applications, SPMs can provide both lateral and vertical resolution that is not generally obtainable from any other type of device.

One type of SPM is the Atomic Force Microscope (AFM), which scans a sharp tip across a surface. The tip is mounted on the free end of a cantilever (lever). The tip is brought to a surface and the force interaction of the tip with the surface causes the cantilever to deflect. The deflection of the cantilever is measured, and the position of the tip or sample can be used to adjust the vertical position of the tip as it is scanned so that the deflection, and thus the force, is kept substantially constant. The tip vertical position versus horizontal scan provides the topographic surface map. In AFM, the tip-sample interaction forces can be made very small, so small as not to deform biological molecules. Atomic force microscopes can also be operated in a non-contact mode where the repulsive force deflects the cantilever as it scans the surface. The deflection of the tip as it is scanned provides topographic information about the surface.

Atomic force microscopes can detect the small movements of the cantilever. Several techniques for cantilever motion detection have been used with the most common method employing reflected light from the cantilever. The deflection of a light beam due to the cantilever motion may be detected, or the movement of the cantilever can be used to generate interference effects which can be used to derive the motion. Atomic force microscopes can be used to image individual atoms as well as for measuring mechanical properties of the sample such as stiffness.

Probing devices have been developed for measuring such properties as electric field, magnetic field, photon excitation, capacitance, and ionic conductance. Whatever the probing mechanism, most SPMs have common characteristics, typically operating on an interaction between probe and surface that is confined to a very small lateral area and is extremely sensitive to vertical position. Most SPMs can position a probe very accurately in three dimensions and use high performance feedback systems to control the motion of the probe relative to the surface.

The positioning and scanning of the probe is usually accomplished with piezoelectric elements. These devices expand or contract when a voltage is applied to them and typically have sensitivities of a few angstroms to hundreds of angstroms per volt. Scanning is implemented in a variety of ways. Some SPMs hold the probe fixed and attach the sample to the scanning mechanism while others scan the probe. Piezoelectric tubes are commonly used and are generally capable of generating three dimensional scans. They are mechanically stiff; have good frequency response for fast scans; and are relatively inexpensive to manufacture and assemble.

FIG. 1 is a simplified block diagram of an exemplary AFM 10. The AFM 10 includes, among other components, an actuator assembly, XYZ actuator assembly or scanner 12, and a controller or control station 14. Control station 14 typically consists of at least one computer and associated electronics and software that perform the tasks of data acquisition and control of the AFM. The control station 14 may consist of a single integrated unit or may consist of a distributed array of electronics and software. The control station may use a typical desktop computer, a laptop computer, an industrial computer and/or one or more embedded processors.

The scanner 12 is mounted over a sample 16 in this case and bears a probe 18 on its lower, moving end. Probe 18 has a cantilever 20 and a probe tip 22 mounted on the free end portion of the cantilever 20. Again, in some cases, the probe tip 22 is positioned by the piezoelectric scanner 12 over a stationary sample 16; or, in some cases, the sample 16 is attached to the scanner 12 and the tip 22 is stationary. The probe 18 is coupled to an oscillating actuator or drive 24 that is used to drive probe 18 to oscillate at or near the probe's resonant frequency. Commonly, an electronic signal is applied from an AC signal source 26 under control of the AFM control station 14 to the drive the AC signal source 26 to oscillate probe 18, such as at a free oscillation amplitude $A_o$. The control station 14 acquires data from the sensing device 28 and through feedback controls the height of the tip 22 by applying control voltages to the scanner 12. The sensing device or detector 28 senses tip deflection. The x and y positions are controlled by applying voltages to the scanner through x and y drivers. Typically for most applications, a raster scan is generated by producing a linear motion in the x and y scan directions. The scan area can be offset by starting the raster from a selected position within the scanner range. The probe tip 22 in this arrangement can be positioned anywhere in x and y within the range of the scanner.

In operation, as the probe 18 is oscillated and brought into contact with sample 16, sample characteristics can be monitored by detecting changes in the oscillation of probe 18. In particular, a beam of light is directed towards the backside of probe 18 which is then reflected towards detector 28, such as a four-quadrant photodetector. As the beam translates across the detector, appropriate signals are transmitted to control station 14 which processes the signals to determine changes in the oscillation of probe 18. Control station 14 generates control signals to maintain, e.g., a substantially constant force between the tip 22 and the sample, typically to maintain a setpoint characteristic of the oscillation of probe 18. For example, control station 14 is often used to maintain the oscillation amplitude at a setpoint value to insure a generally constant force between the tip 22 and the sample 16. In other cases, a setpoint phase or frequency is used. The data collected by the control station 14 is typically provided to a workstation that manipulates the data obtained during scanning to perform the point selection, curve fitting, distance determining operations, and other functions. For some AFMs, the workstation is the control station. For other AFMs, the workstation is a separate on-board controller, a separate off-board controller, or any combination of the three.

In existing probe microscopes, drift of the probe tip across the sample is a significant effect. The drift can distort the image and can make it difficult to continue imaging the same feature over time. Typically, drift in the x-y plane is several angstroms per minute after the set-up has stabilized. Drift can be much greater when a sample is first contacted, sometimes requiring several hours of stabilization before accurate scanning can occur. Drift is due to, among other things, thermal expansion of the piezoelectric scanner as well as the sample itself and its holder. Additional drift contributions due to "creep" and hysteresis of the piezoelectric material are often present but drift due to thermal expansion is typically the most pronounced. Some drift, such as the drift due to thermal effects, are long-term and are typically constant over the scanning of single images. Drift present when imaging with a scanning probe microscope can restrict its ability to dwell on atomic dimension features, which is useful for monitoring local processes or acquiring repeated images of unique structures. Drift also can cause inordinately long stabilization times before undistorted images can be acquired for larger sample sizes.

Many existing designs attempt to reduce the drift by controlling the position of the probe during the scanning process. Other attempts to reduce drift include matching thermal coefficients for probe materials or using superstructure materials that are primarily susceptible to thermal effects such as drift and thus are very stable. For instance, Invar® (is a registered trademark of Imphy Alloys of Puteaux, France), a steel alloy, is commonly used in the construction of AFMs to minimize thermal drift. While Invar will become heated during a scan, the Invar steel alloy will not expand and therefore not drift.

More specifically, Invar is a nickel steel alloy that has a low coefficient of thermal expansion. As a result, it is commonly used in the construction of scientific instruments. While Invar has certain characteristics, such as a low coefficient of thermal expansion, that make it well suited for AFMs, Invar is not widely available and thus is costly. A cost effective, low drift AFM solution was desired.

SUMMARY OF THE INVENTION

The present inventors have recognized that more accurate measurements can be taken with less drift due to thermal expansion by precisely controlling insulated heating and cooling modules abutting one another in substantial alignment to rapidly heat a sample to be scanned by a Scanning Probe Microscope (SPM) with minimal temperature variation. The heating and cooling modules can be "flat-packed," with parallel surfaces of each module in contact with one another, to more efficiently heat a sample that is positioned in axial alignment with the heating and cooling modules. This can allow heating the sample to at least 250 degrees Celsius in less than 5 seconds (in open air), continuously maintaining a temperature of the sample to within ±0.001 degree Celsius, and maintaining a drift of less than 0.1 nanometers per minute in the z direction.

In one aspect, a low drift heater/cooler is achieved by flat-packing a ceramic heating element (preferably made according to a proprietary sintering process to facilitate densification and grain growth—uniform grain size with no open porosity—high mechanical strength and optimal thermal conductivity), with a water-cooled heat-transfer mechanism. Dissimilar ceramic material can be used for the heater base, with 20× the thermal conductive resistance of the heating element, placed as close to the heating element as ceramic bond-line thickness physically allows (approximately 0.004"), directly below the heating element ceramic base. Subsequently, the heater module can be attached directly to a high-surface-area heat-sink that is immersed in a process-coolant stream. Both the heating element and the process cooler can utilize Proportional-Integral-Derivative (PID) temperature control, resulting in increased temperature stability over time, low temperature-overshoot (on the order of less than 1 degree Celsius), a high ramp-up-to-temperature-setpoint, and a fast cooling-to-setpoint. The system allows for temperature stabilization to occur in ~1/10th of the time over previous systems.

In one aspect, a small (12×12×2 mm) high-ramp-rate ceramic heater, incorporating a centrally located K-type thermocouple, and with flatness and parallelism requirements adequate to be directly bonded to a magnetic-sample-holder used in Nano-Dynamic Mechanical Analysis (nDMA) is employed. AFM microscopy techniques, can be used in conjunction with a PID-controlled process chiller, a low-pressure high-accuracy (adjustable to ±10 mL per minute) peristaltic pump, and a heat-transfer mechanism to achieve a very-low-drift (±0.001 degree Celsius) heater/cooler for nDMA. The system can provide cooling elements as close as physically possible to the heater element, taking advantage of a low thermal mass design.

Use of dissimilar ceramic materials, in close proximity, with different thermal conductivity properties, but similar thermal expansion coefficients are employed. Adjustment of the ceramic heater base material (type) allows for precisely adjusting the Max/Min temperature range capability of the device. Reduction of the temperature range, for example from 25-250 degrees Celsius down to 25-150 degrees Celsius, through change of one mechanical part, allows for even greater temperature precision within a lower temperature range.

An intrinsic low-thermal-mass of the system can allow for rapid heating and cooling, with minimal power requirements, and with optimally-minimized heat-transfer to the AFM system. Radial heat losses can be minimized using a double-thin-wall feature radial to the heater module. Temperature gradients of 200 degrees Celsius over a distance of 10 mm can be achieved. As a result, minimizing heat-loss to the micro-environment of the Atomic Force Microscope (AFM) allows for faster temperature stabilization of the overall microscope system. Maintaining the smallest heat envelope possible through design geometry, both radially and axially, allows for a high temperature ramp-up and ramp-down for the relatively small mass of the a) heater base, b) heater element, c) magnetic sample holder, d) sample disk, and e) sample. In the current system, the aforementioned components are approximately 3 grams, thus being "Low Thermal Mass."

This Low Thermal Mass system can also lend itself to "micro-miniaturization," with applications in many fields including analytical instrumentation, handheld instrumentation, gas chromatography, mass spectrometry, microelectronics, microfluidics, integrated circuits and passive electronic component temperature control.

Due to the Low Thermal Mass nature intrinsic to the system, multiple heater/cooler units can be in close proximity and can have significant temperature differences between them (>200 degrees Celsius).

Extending the capability of the system can be achieved through tertiary control of the process cooler, of the flow-rate of the cooling fluid, and including closed-loop control of process cooler pressure/flow. The current system can achieve high-accuracy with a fixed process cooler temperature of 20 degrees Celsius, and a fixed flow rate of ~150 mL per minute; adjustment of either of these parameters can change the heater Max/Min range. For example, reducing the process cooler temperature can reduce the Max temperature achievable, and increasing the process cooler temperature can increase the Max achievable temperature.

Precise coolant flow can be achieved through use of a process chiller in combination with a peristaltic pump, wherein the process chiller fluid loop is segregated from the peristaltic fluid cooling loop by means of a plate-heat-exchanger. The advantage of utilizing 'high-pressure-high-flow' and 'low-pressure-low-flow' cooling loops in tandem is twofold: if the process chiller has a high heat-sink capability (such as 400 Watts), and a continuous flow, heat can be rapidly pumped from one loop to the other without running high-volume, high-pressure coolant into the AFM microenvironment. This system can mitigate this issue. Additionally, separating the high- and low-pressure coolant loops can allow for additional mechanical dampening: applying viscoelastic dampening material to the heat-transfer plate can further isolate the process cooler (and its inherent noise due to pumps and fan rotation), allowing for a lower noise-floor. Use of a peristaltic pump in the 'low-pressure-cooling-loop' can allow for precise cooling, for lower noise transmission to the AFM, and for ensuring laminar flow through the low-drift-heater heat-sink. Maintaining laminar flow can minimize turbulence and resultant noise.

Specifically then, one aspect of the present invention can provide a metrology instrument for measuring a sample, including: a structure for supporting the sample, the structure being configured to provide a low thermal mass that is operable to maintain a drift of the sample to less than 0.1 nanometers per minute in the z direction.

Another aspect of the present invention can provide a low drift heater assembly, including: a heating module providing a heat source; and a cooling module for cooling the heat source, in which the heating and cooling modules abut one another in axial alignment, and in which the heating and cooling modules are simultaneously active to control heat transfer through the axial alignment to a sample to be scanned.

Another aspect of the present invention can provide an AFM, including: a base; a bridge structure coupled to and supported by the base; a z-axis actuator coupled to the bridge structure; a head assembly coupled to the z-axis actuator, the head assembly including an atomic force probe; and a low drift heater assembly supported by the base, the low drift heater assembly including: a sample holder assembly configured to magnetically hold a sample disk containing a sample to be scanned; a heating module providing a heat source; and a cooling module for cooling the heat source, in which the sample holder assembly and the heating and cooling modules are in axial alignment, and in which the heating and cooling modules are simultaneously active to control heat transfer through the axial alignment to the sample to be scanned.

Another aspect of the present invention can provide a low drift heating method, including: providing a heating module for generating a heat source; providing a cooling module for cooling the heat source, abutting the heating and cooling modules to one another in axial alignment; and simultaneously activating the heating and cooling modules to control heat transfer through the axial alignment to a sample to be scanned.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE INVENTION

Figure 1:
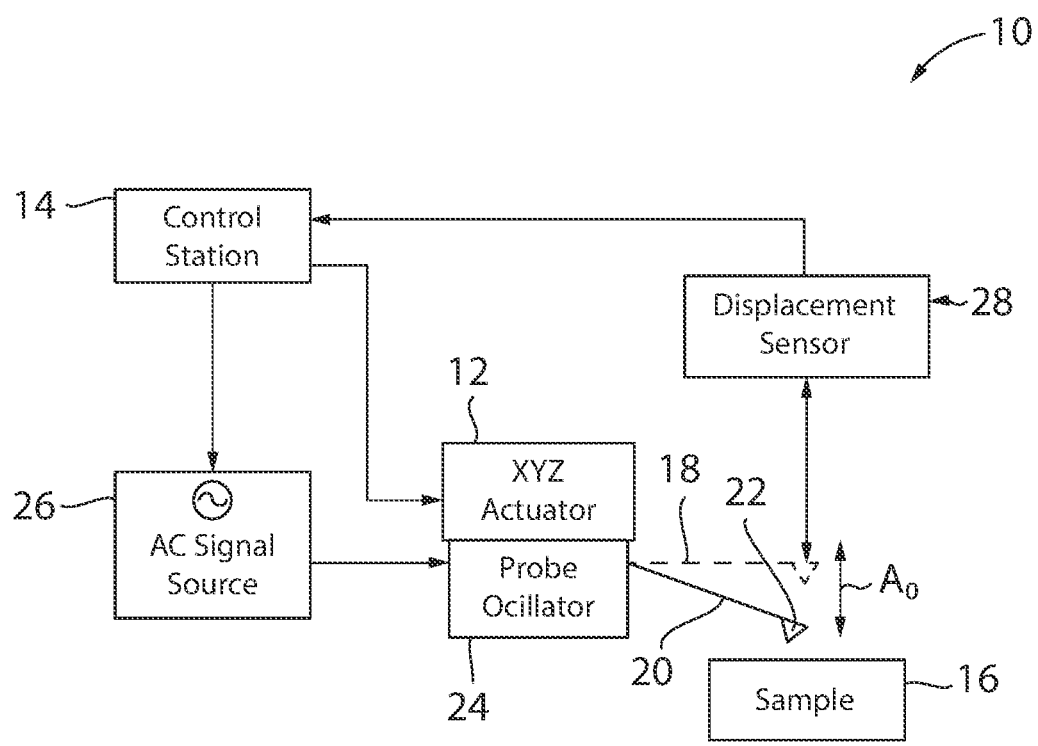
FIG. 1 is a simplified block diagram of an Atomic Force Microscope (AFM) appropriately labeled "Prior Art;"
Figure 2:
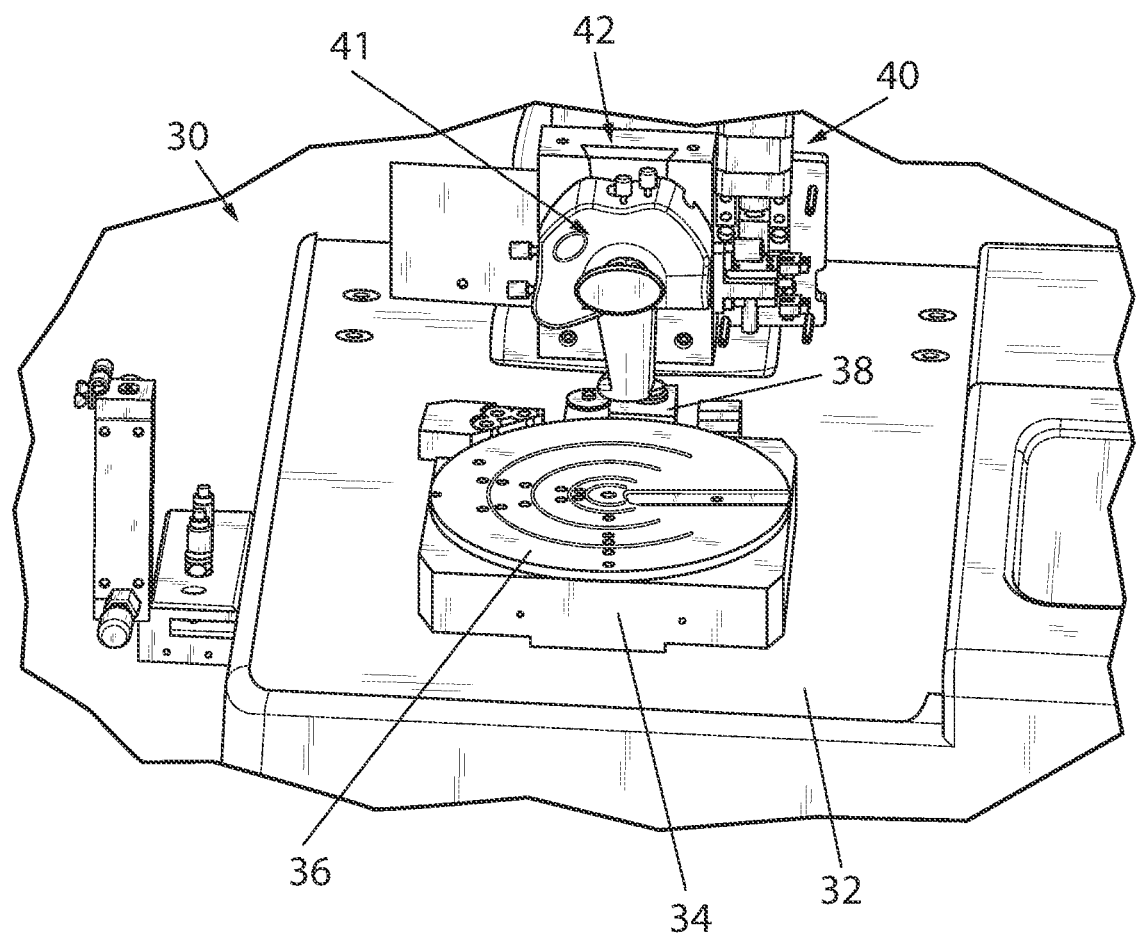
FIG. 2 is an exemplar scanning AFM having a low drift heater assembly in accordance with an aspect of the invention.
Figure 3:
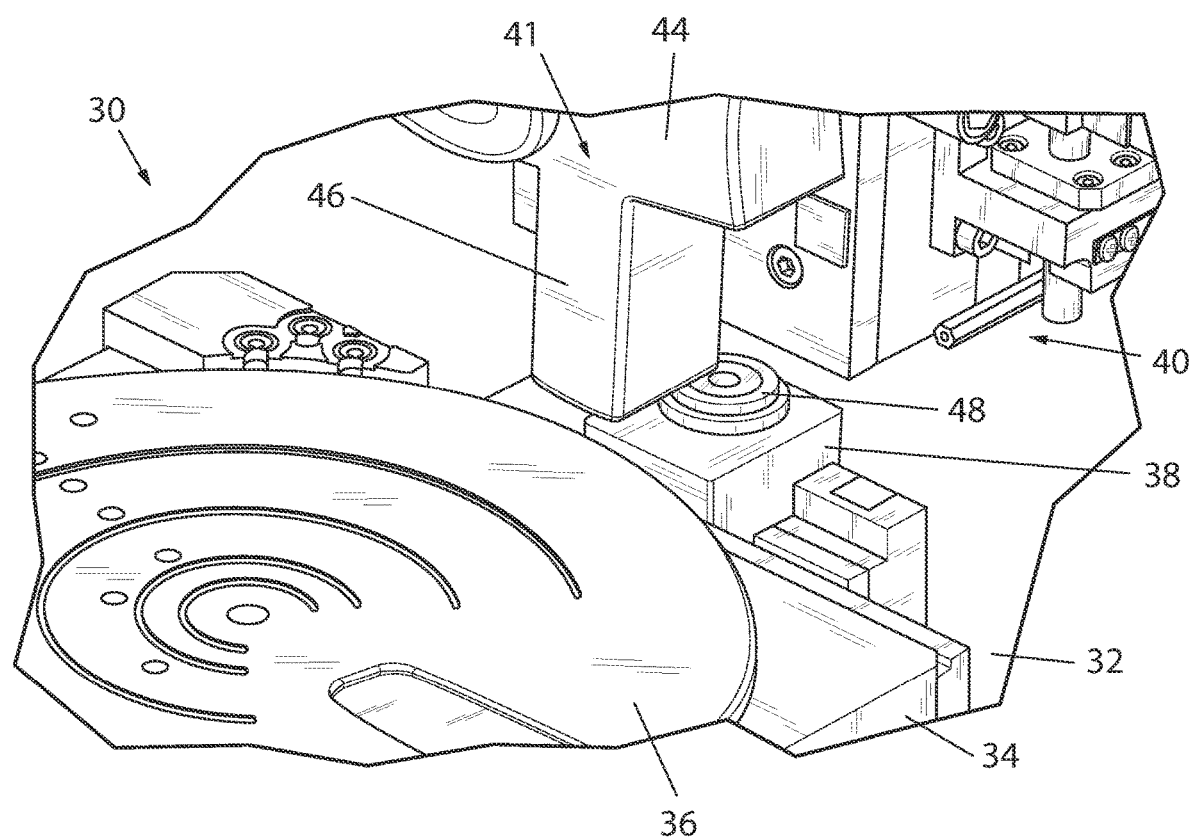
FIG. 3 is a detailed view of the low drift heater assembly of FIG. 2.

Turning now to FIGS. 2 and 3, an AFM 30 according to an aspect of the present invention is shown. The AFM 30 can include a block 32 made of granite or similar material, which supports a chuck base 34, chuck 36, low drift heater assembly 38 and bridge 40. A z-stage 42 can be mounted to the bridge 40 to support a head 41. As known in the art, the head 41 can include the probe and probe holder (e.g., in the scanning tip design), such as probe 18 described with respect to FIG. 1. More particularly, the head 41 can support a housing 44 that supports control electronics and, in this case, a piezoelectric tube actuator 46 that extends orthogonally to a sample placed with respect to the low drift heater assembly 38 supported by an accessory bracket. When a scanning probe or tip design is employed, the piezoelectric tube actuator 46 can support the probe (18 shown in FIG. 1) that is used to interact with a sample surface held by low drift heater assembly 38.

A motor supported by a backside of the bridge 40 can be operable to raise and lower the head 41 to course control the position of the probe tip relative to the sample, which can sit on a sample disk (not shown) supported by sample holder assembly 48 of the low drift heater assembly 38. As best shown in FIG. 3, the head 41 can be mounted to the z-stage 42 and the z-stage 42 can be supported by the bridge 40 such that the probe 18 and tip 22 are centered horizontally (in the x-axis) relative to the bridge 40. This symmetry helps reduce drift of the tip 22, especially along the x-axis. In this case, the chuck 36 is formed to accommodate movement of the low drift heater assembly 38 relative to the head 41, e.g., for loading and unloading samples. The AFM 30 could be part of an Dimension Icon® AFM system as available from Bruker.

Figure 4:
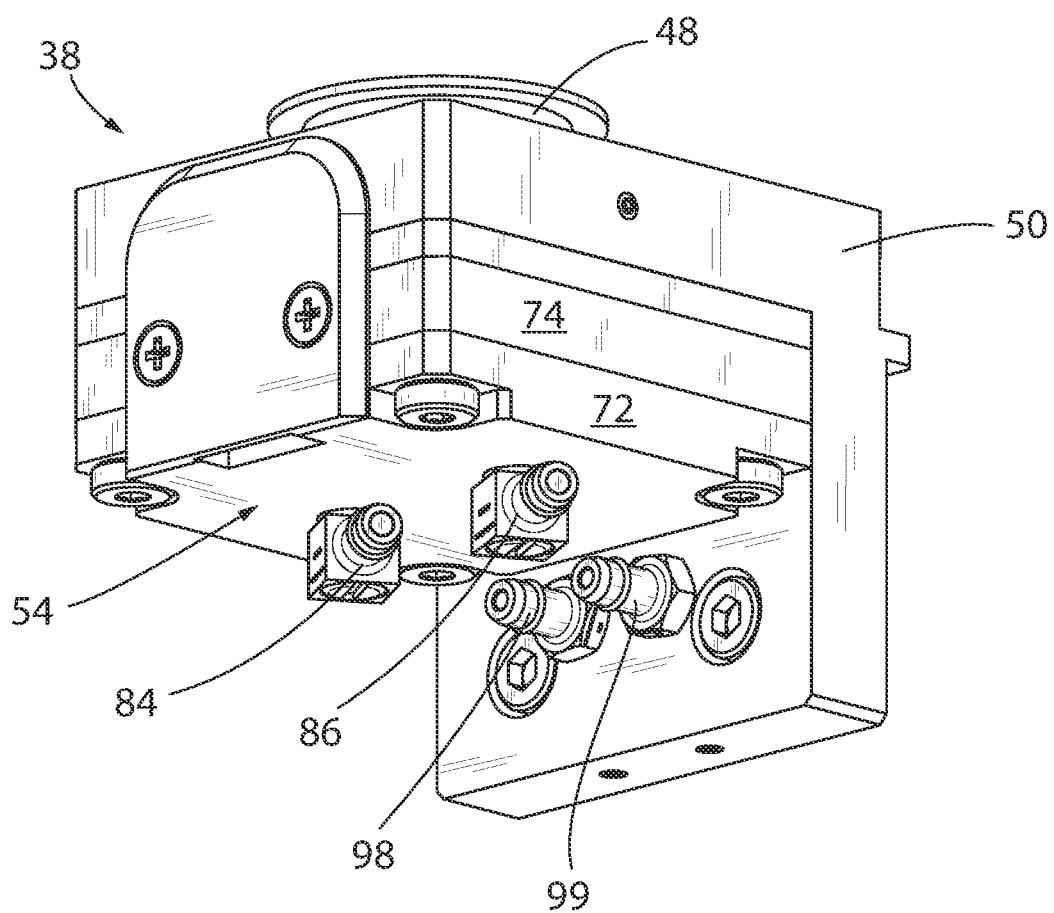
FIG. 4 is an isometric view of a low drift heater assembly in accordance with an aspect of the invention.

With additional reference to FIG. 4, the low drift heater assembly 38 can comprise a bracket 50 retaining a heating module 52 providing a heat source (see FIGS. 5-8), a cooling module 54 for cooling the heat source (see FIGS. 9-11) and the sample holder assembly 48. The present inventors have recognized that more accurate measurements of a sample can be taken with less drift due to thermal expansion by insulating the heating module 52 and precisely controlling the heating and cooling modules 52 and 54, respectively, abutting one another in substantial alignment to rapidly heat the sample with minimal temperature variation. The heating and cooling modules 52 and 54, respectively, can be flat-packed, with parallel surfaces of each module in contact with one another, to more efficiently heat the sample that is positioned in axial alignment along an axis 55 with the aforementioned modules. This can allow heating the sample to at least 250 degrees Celsius in less than 5 seconds. This can also allow continuously maintaining a temperature of the sample to within ±0.001 degree Celsius.

The bracket 50 can retain the heating and cooling modules 52 and 54, respectively, and the sample holder assembly 48, based on the geometric shapes of the aforementioned structures and corresponding fasteners. The bracket 50 preferably comprises a thermally insulating material with low thermal expansion, such as Invar, which can keep the bracket 50 at a temperature of less than 50 degrees Celsius, and thereby cool to the touch, despite heating the sample to temperatures on the order of 250 degrees Celsius. The bracket 50 thereby acts as an insulator, minimizing all forms of heat transfer, except conduction to the sample and/or coolant module. In addition, as may best be seen in FIG. 8, the bracket 50 has structural shape and features which enhance axial heat flow, and minimize radial flow, including two concentric, thin walls surrounding the heating module 52. Also, liquid cooling with nitrogen (a liquid cooling with no water vapor) can be configured to flow through the bracket 50 to further reduce radial heat transfer through conduction. Such liquid flow can be provided by hoses, tubes or other lines connected to ingress and egress liquid cooling bracket quick connects 98 and 99, respectively (see FIG. 4).

The heating and cooling modules 52 and 54, respectively, and the sample holder assembly 48 are constructed to collectively comprise a structure having a low thermal mass to provide an efficient, targeted heat transfer system along the axis 55. For example, a combined weight of the aforementioned structures (including insulating material surrounding the sample holder 48) could be less than 3 grams, such as 2.7 grams. Accordingly, the aforementioned structures contribute to a low "thermal mass" to the extent they comprise thermally conductive materials separated by insulating materials, such as the bracket 50 (not counting toward the thermal mass). In one aspect, a low thermal mass can be maintained by keeping the weight of the heating and cooling modules 52 and 54, respectively, and the sample holder assembly 48 to less than 3 grams. Low thermal mass means a low specific heat capacity of the total of parts that need to be temperature controlled. Low thermal mass provides heating and cooling simultaneously the lowest mass possible for an experiment. This can allow a temperature variation of less than +/−0.001 C 2 minutes after reaching a setpoint.

Figure 5:
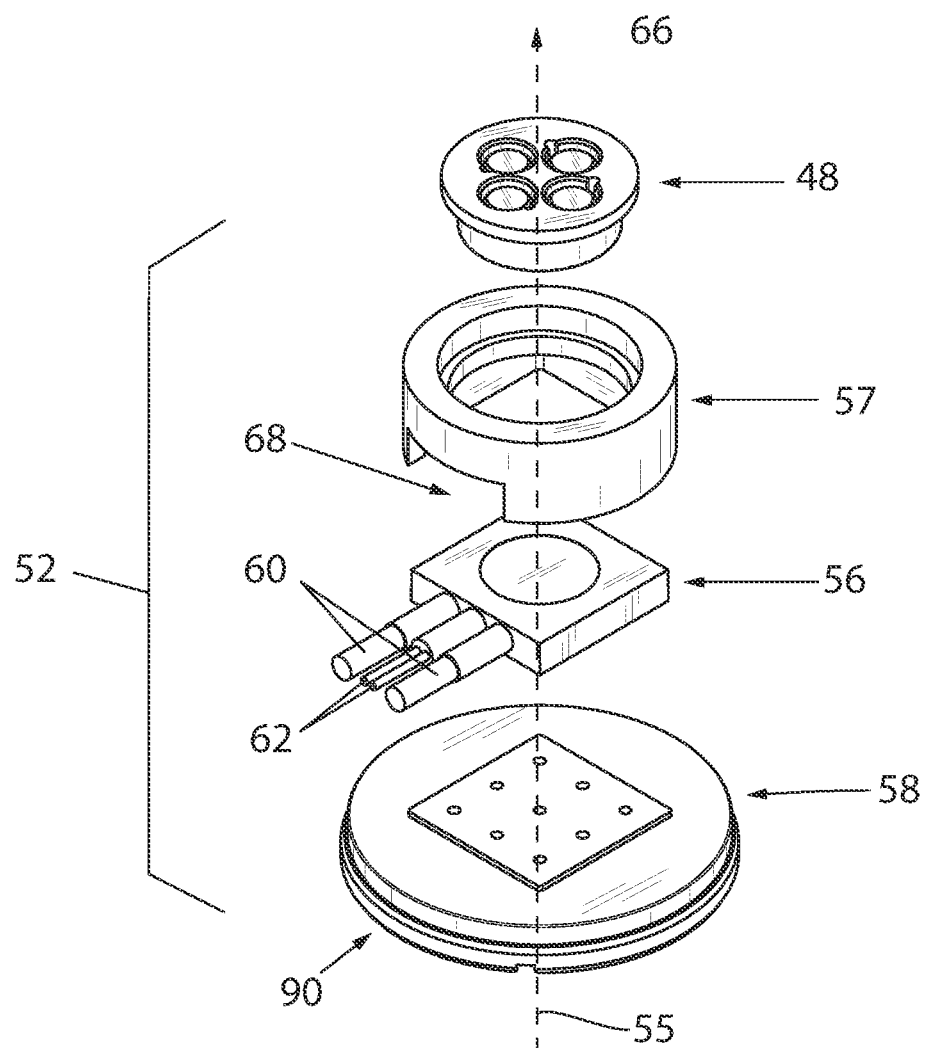
FIG. 5 is an exploded isometric view of a heating module of the low drift heater assembly of FIG. 4.
Figure 6:
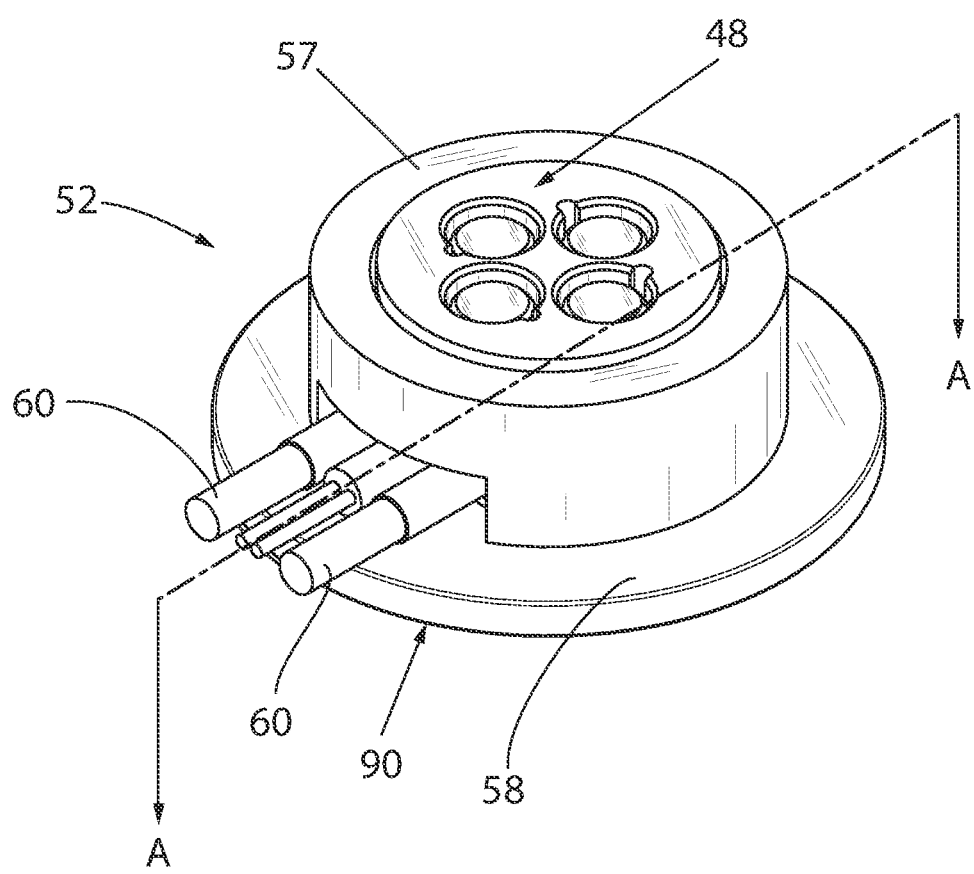
FIG. 6 is an assembled isometric view of the heating module of FIG. 5.
Figure 7:
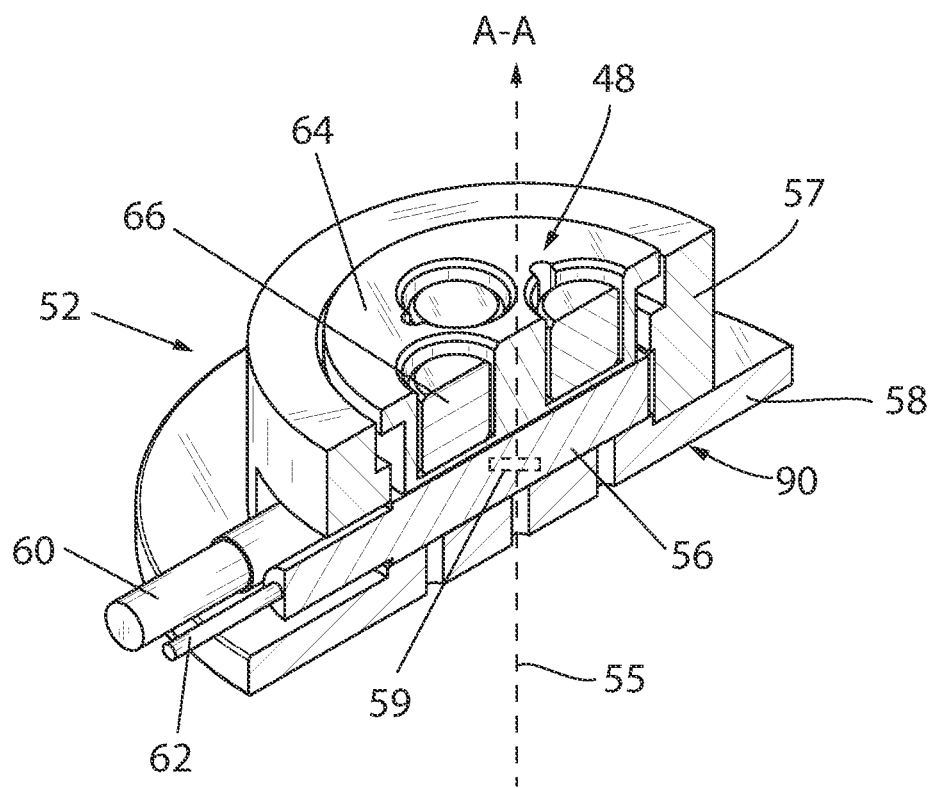
FIG. 7 is a cross sectional isometric view of the heating module of FIG. 5 taken along the line A-A of FIG. 6.
Figure 8:
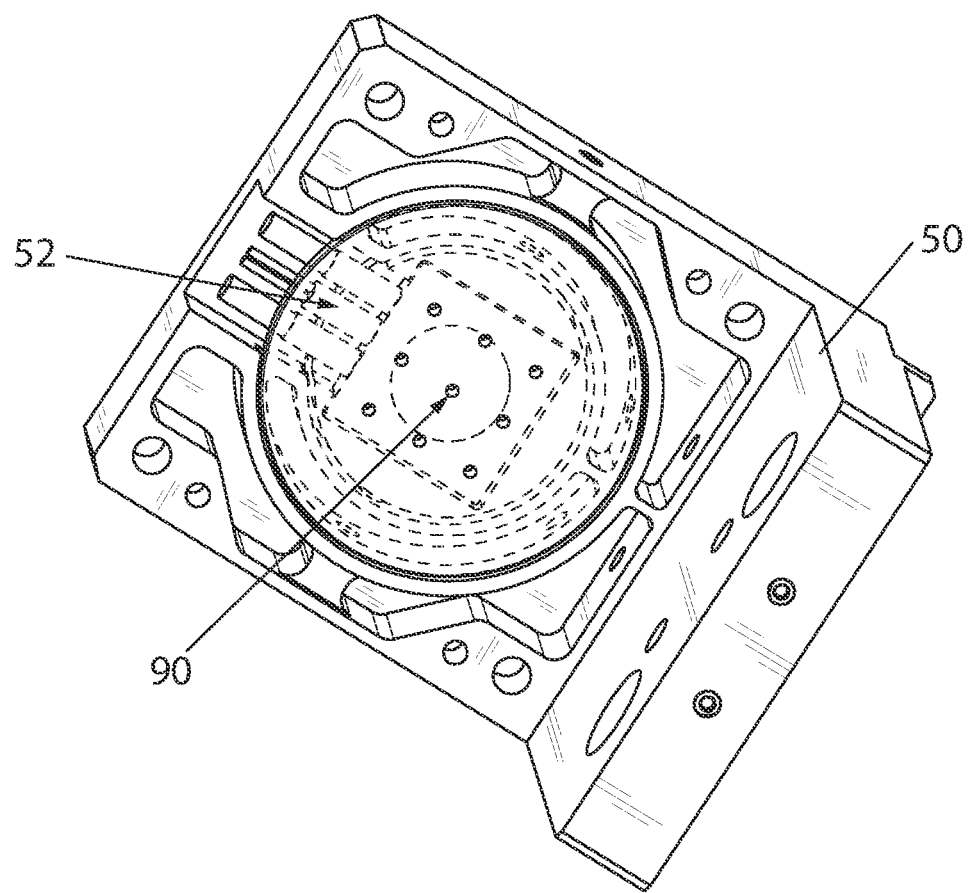
FIG. 8 is an isometric view of an underside of the low drift heater assembly of FIG. 4, shown with a cooling module removed, thereby exposing an underside of the heating module.

Referring now to FIGS. 5-7, various views of the heating module 52, incorporated in the low drift heater assembly 38, are provided in accordance with an aspect of the invention. As may best be seen in the exploded view of FIG. 5, the heating module 52 can comprise an electrically controlled heater component 56 enclosed by a thermally insulating structure providing the heat source. The thermally insulating structure can comprise a ceramic cylinder 57 circumferentially surrounding the heater component 56 and a ceramic disk 58 separating the heater component 56 from the cooling module 54. In one aspect, the ceramic cylinder 57 and the ceramic disk 58 can comprise dissimilar ceramic materials, in close proximity, with different thermal conductivity properties, but similar thermal expansion coefficients. Adjustment of the ceramic heater base material (type) can allow for precisely adjusting the Max/Min temperature range capability of the device. Reduction of the temperature range, for example from 25-250 degrees Celsius down to 25-150 degrees Celsius, through change of one such mechanical part, can allow for even greater temperature precision within a lower temperature range.

The electrically controlled heater component 56 could be a square ceramic heater element containing nickel-chromium wires 60 for electrical heating control, such as application of +12V DC and −12V DC, applied under the direction of a controller. The heater component 56 is preferably small, such as 12×12×2 mm, with high-ramp-rate. In addition, as may best be seen in FIG. 7, a cross sectional isometric view of the heating module 52 taken along the line A-A of FIG. 6, the heater component 56 can include a centrally-located K-type thermocouple 59 shown in phantom. The thermocouple 59 can be sandwiched in between high-thermal conductivity Aluminum Nitride ceramic (AlN). The thermocouple 59 can be monitored by a controller, for example, through electrical wires 62, for receiving temperature feedback. The heater component 56 preferably has substantial flatness and parallelism to allow direct bonding to the sample holder assembly 48 on an upper surface and the ceramic disk 58 on a lower surface.

The AlN matrix is constructed of two parts. The heating element is deposited on one of the AlN parts. Then, the parts are sintered together, making them one homogeneous assembly. The high thermal conductivity of AlN and an optimized circuit layout combine to produce superb temperature uniformity across the heater surface. The benefits of using Aluminum Nitride (AlN) heating element include: Advanced ceramics are synthetic, inorganic compounds of exceptional purity. Ceramic compounds include alumina (Al$_2$O$_3$), silicon nitride (Si3N4) and AlN. AlN is an excellent choice for a ceramic heater platform as it allows for a homogeneous assembly for atmospheric or vacuum applications. The material also provides the durable heater construction and thermal transfer necessary for high temperature, fast cycling and long heater life. Additional features and benefits received by using AlN construction include: High thermal conductivity—exhibiting thermal conductivity similar to aluminum provides rapid heat dissipation, enables the heater to be constructed with a high watt density and gives it the ability to thermally ramp at a rate of 150° C. (270° F.) per second. Also he heating element a clean, non-contaminating material: using a carefully controlled microstructure, high temperature sintering produces a heater that is very hard (1100 Kg/mm2) and dense (>99% theoretical density) with virtually no porosity. AlN is an ideal choice for applications requiring a "clean" heater. The heater also provides moisture resistance; in particular, AlN is impervious to moisture unlike many hygroscopic dielectric materials used in conventional heater construction. This also allows liquid cooling directly adjacent to the heater element itself. The heater also has high dielectric strength and high insulation resistance. AlN is an electrical insulator that features very low leakage current (<10 µA @ 500 VAC), a highly preferred characteristic for many instrumentation applications.

The sample holder assembly 48 can be bonded to the heating module 52, such as by an adhesive. The sample holder assembly 48 can comprises a sample holder 64 or "puck" having multiple apertures, such as four, for holding magnets 66. The magnets 66 can be bonded into the apertures by an adhesive. The sample holder assembly 48 could be a stainless-steel disk with a diameter of about 0.5 inches, weighing about 0.685 grams without the magnets 66, or about 0.78 grams with the magnets 66. Accordingly, the sample holder assembly 48 can be configured to magnetically hold a sample disk (not shown) containing a sample to be scanned during experimentation.

The ceramic cylinder 57 can be a ring or other shape for circumferentially surrounding the heater component 56. The ceramic cylinder 57 can include an electrical access opening 68 for providing ingress/egress for the wires 60, 62.

The ceramic disk 58 can comprise a substantially planar surface for receiving the heater component 56 and the ceramic cylinder 57. The ceramic disk 58 can include multiple apertures providing relief for adhesive flow when bonding the heater component 56 thereto.

As a result, radial heat losses are minimized using a double-thin-wall feature radial to the heating module 52. Temperature gradients of 200 degrees Celsius over a distance of 10 mm can be achieved. This can also minimize heat-loss to the micro-environment of the AFM 30 to allow for faster temperature stabilization of the overall microscope system.

In one aspect, the heater component 56 could be an Alumina-Nitride heating element encapsulated in a ceramic material that is 20× (20× 'R' value) more insulating, resulting in a system providing an optimized axial heat transfer along the axis 55. In other words, heat can travel through the direct center of the assembly (axially) 20× more easily than radially. Because the ceramic disk 58 on the bottom provides 20$x$ the thermal insulation of the heater component 56, heat transfer is also optimized, and can flow 20$x$ more easily to heat the sample than to cool (heat transfer directed upward towards the sample).

Figure 9:
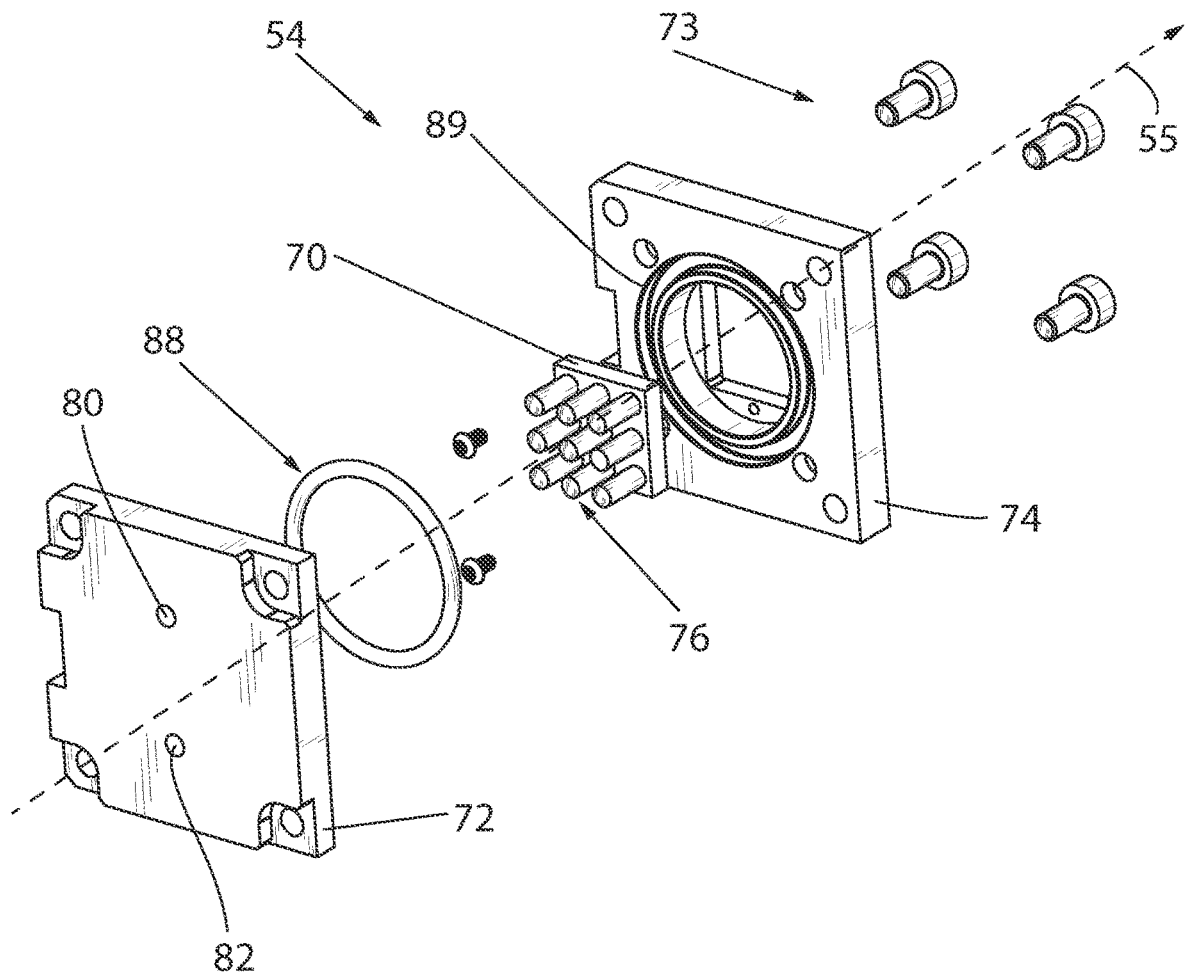
FIG. 9 is an exploded isometric view of a cooling module of the low drift heater assembly of FIG. 4.
Figure 10:
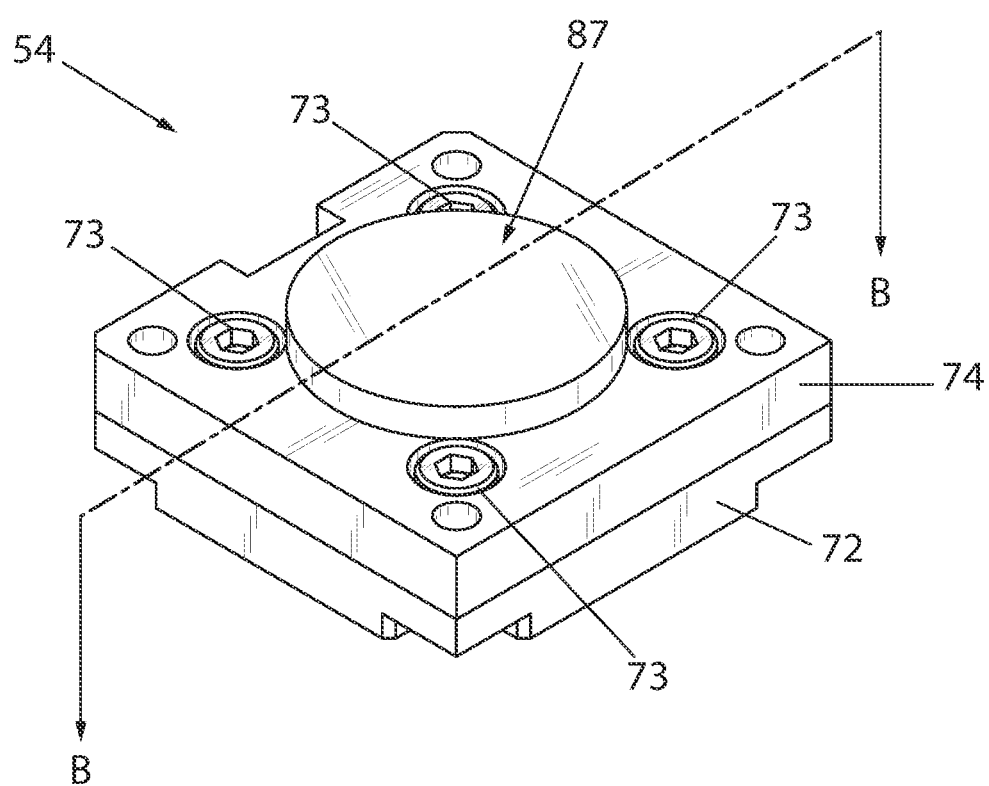
FIG. 10 is an assembled isometric view of the cooling module of FIG. 9.
Figure 11:
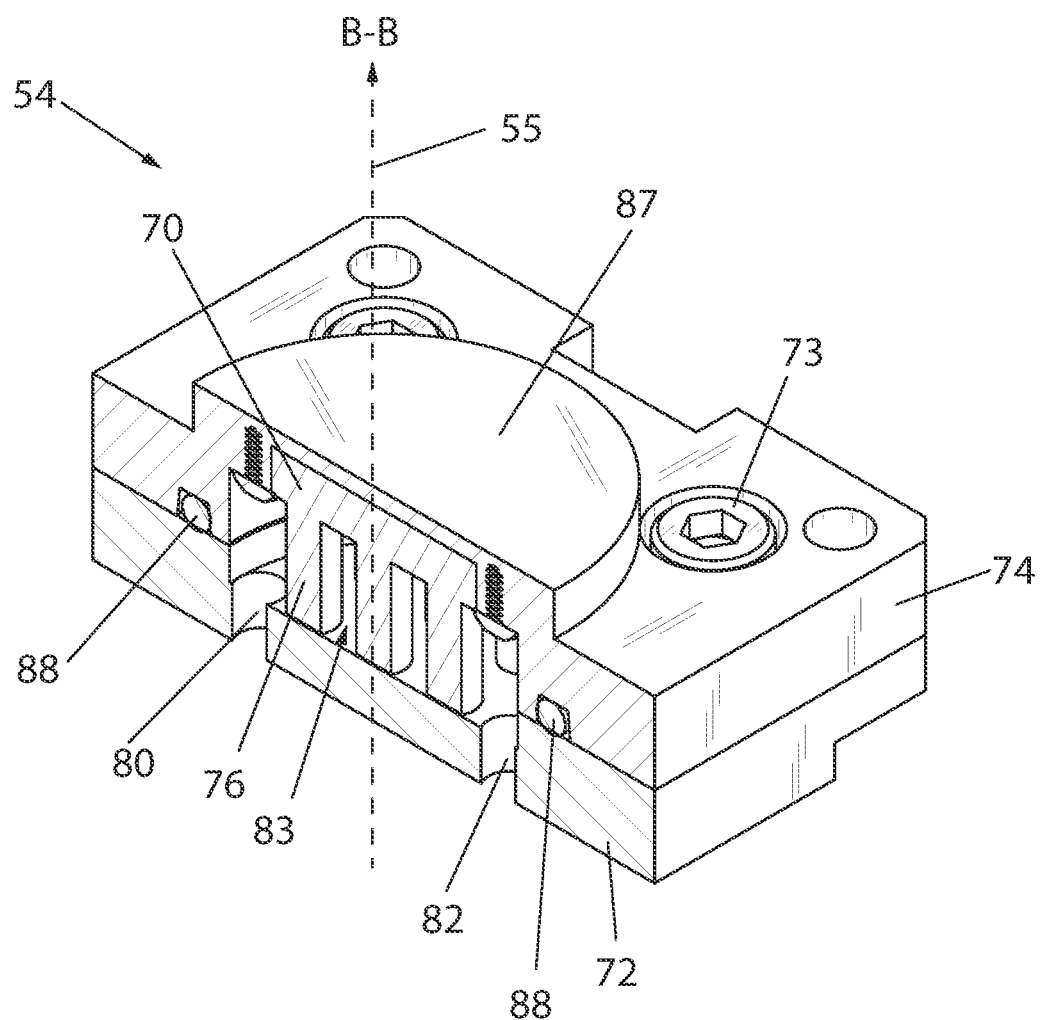
FIG. 11 is a cross sectional isometric view of the cooling module of FIG. 9 taken along the line B-B of FIG. 10.

Referring now to FIGS. 9-11, various views of the cooling module 54, incorporated in the low drift heater assembly 38, are provided in accordance with an aspect of the invention. As may best be seen in the exploded view of FIG. 9, the cooling module 54 can comprise a heat sink 70 enclosed by thermally conducting first and second cooling blocks 72 and 74, respectively, held by fasteners 73. The heat sink 70 can include multiple heat dissipating elements 76, such as pins or fins, for removing heat, preferably in a liquid cooling solution such as water.

In one aspect, one of the cooling blocks, such as the first cooling block 72, can include liquid ingress and egress ports 80 and 82, respectively, providing a through path for liquid cooling of the heat sink 70 and heat dissipating elements 76 in a cooling cavity 83 (see FIG. 11). Such liquid flow can be provided by hoses, tubes or other lines connected to ingress and egress liquid cooling block quick connects 84 and 86, respectively (see FIG. 4). In addition, to retain such liquid in the cooling cavity 83, a resilient seal 88 can circumferentially surrounding the heat sink 70 between the first and second cooling blocks 72 and 74, respectively, for sealing liquid in the cooling module 54 (see FIG. 9). The resilient seal 88 can be positioned in a corresponding channel 89 of each of the first and second cooling blocks 72 and 74, respectively, and can compress to form a liquid tight seal of the cavity 83 upon application of fasteners 73.

When assembled, a substantially flat, lower surface 90 of the heating module 52 is parallel to and in contact with a substantially flat, upper surface 87 of the cooling module 54 so that the heating and cooling modules 52 and 54, respectively, are abutting one another in axial alignment along the axis 55. This flat-pack arrangement with axially aligned heat transfer allows rapid heating of a sample to be scanned with minimal temperature variation, superior to arrangements which may abut heating and cooling modules but without such axial alignment. In addition, thermal interface material disposed in between the heating and cooling modules 52 and 54, respectively, contacting the lower surface 90 of the heating module 52 and the upper surface 87 of the cooling module 54, can further enhance heat transfer and adjust system temperature range.

Figure 12:
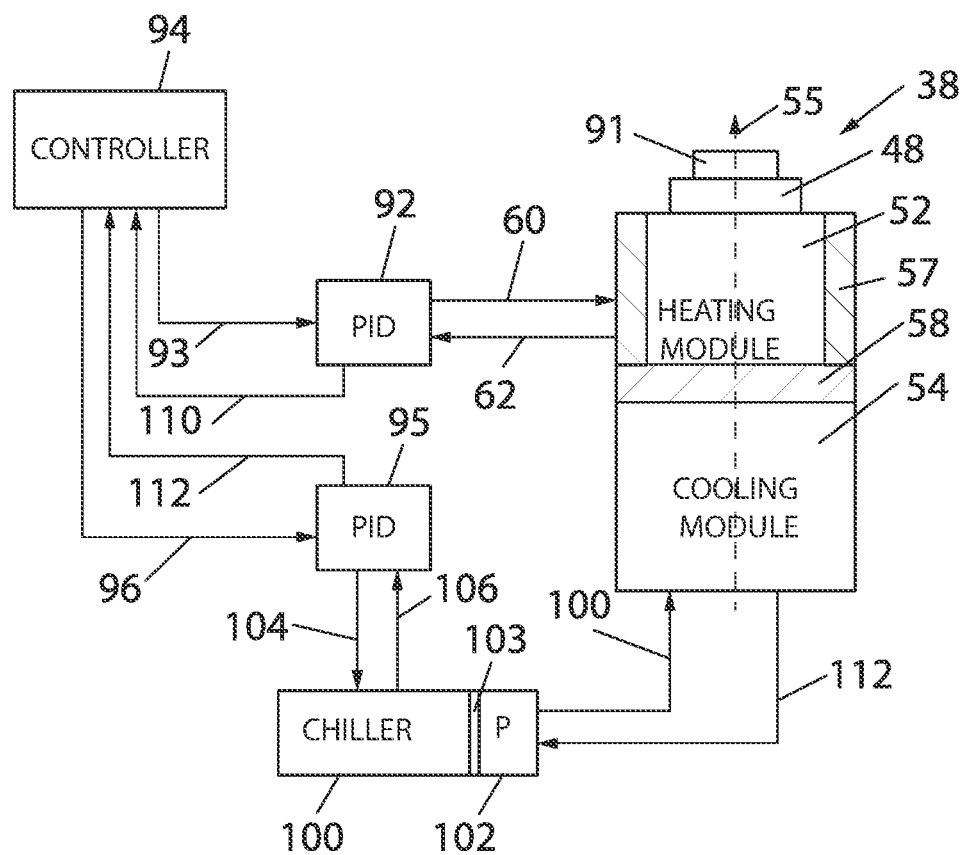
FIG. 12 is a diagram illustrating operation of the low drift heater assembly in accordance with an aspect of the invention.

Referring now to FIG. 12, in operation, the heating and cooling modules 52 and 54, respectively, abutting one another in axial alignment along the axis 55, can be simultaneously active to control heat transfer through the axial alignment to the sample holder assembly 48 magnetically holding a sample disk 91 containing a sample to be scanned. With the insulation provided by the ceramic cylinder 57 and the ceramic disk 58, the heat transfer can be effectively directed vertically or upward, from the cooling module 54, through the heating module 52 and the sample holder assembly 48, to the sample disk 91 and the sample. In addition, the heating and cooling modules 52 and 54, respectively, can be precisely controlled by closed-loop control systems to accurately and effectively control temperature, and therefore heat transfer, through the axial alignment defined by the axis 55. By simultaneously heating and cooling, temperature of a very small thermal mass can be controlled very accurately. The explanation for this is that constant cooling allows for constant heating, in turn, this means that a power input (heating in Watts) can be moderate-to-high to maintain temperature. While controlling a non-zero, close-to-zero amperage can be difficult due to the difficulty in controlling small amounts, when constantly cooling, maintaining a setpoint can require continuously supplying power to the heater that is comparatively easier to control.

In one aspect, the heating module 52 can be controlled in closed-loop control system, such as by a Proportional-Integral-Derivative (PID) controlled heating loop 92. The heating loop 92 can receive a heating set point 93 from a controller 94 (which could be part of the control station 14). The heating set point 93 could define a desired temperature or process value for the heating module 52 to achieve. The heating loop 92 can then control the heater component 56, through a control line provided by the wires 60 for electrical heating control, while adjusting for feedback received through a feedback line provided by the wires 62 providing temperature feedback, in a closed loop control system. Also, the heating loop 92 can provide feedback 110 to the controller 94 for coordinating control between the heating and cooling modules 52 and 54, respectively.

In addition, in one aspect, the cooling module 54 can be controlled in closed-loop control system, such as by a PID controlled cooling loop 95. The cooling loop 95 can receive a cooling set point 96 from the controller 94. The cooling set point 96 could define a desired temperature or process value for a process chiller 100 and pump 102 to achieve with respect to the cooling module 54. The cooling loop 95 can control the process chiller 100 through a control line 104, while adjusting for feedback from the process chiller 100 through a feedback line 106, in a closed loop control system. Also, the cooling loop 95 can provide feedback 112 to the controller 94 for coordinating control between the heating and cooling modules 52 and 54, respectively.

The pump 102, which is preferably a peristaltic pump (adjustable to ±10 mL per minute), in turn, precisely controls fluid through fluid output and input lines 110 and 112, connected to the ingress and egress liquid cooling quick connects 84 and 86, respectively, in a separate fluid cooling loop. In one aspect, the process chiller 100 fluid cooling loop can be segregated from the pump 102 fluid cooling loop by a plate-heat-exchanger having a heat-transfer plate 103. This allows utilizing a high-pressure-high-flow cooling loop (the process chiller 100 fluid loop) in tandem with a low-pressure-low-flow cooling loop (the pump 102 fluid cooling loop). In such an arrangement, if the process chiller 100 has a high heat-sink capability, such as 400 Watts, and a continuous flow, heat can be rapidly pumped from one loop to the other with negligible risk of running an undesirable high-volume, high-pressure coolant into the microenvironment of the AFM 30. Additionally, separating the high- and low-pressure coolant loops can allow for additional mechanical dampening (such as applying viscoelastic dampening material to the heat-transfer plate 103 to further isolate the process cooler (and any inherent noise due to pumps and/or fans), thereby allowing for a reduced noise-floor. Use of the pump 102, preferably being a peristaltic pump, in the low-pressure-cooling-loop allows for precise cooling, for very-low-noise transmission to the AFM 30, and for ensuring laminar flow through the low drift heater assembly 38. Maintaining laminar flow can be important to the system, for example, to minimize any turbulence which could result in measurement noise. However, in another aspect, the process chiller 100 and the pump 102 could be used to control cooling of the cooling module 54 as described above, but without a closed-loop control system, such as with the pump 102 having a fixed flow rate of about 150 mL per minute.

Figure 13:
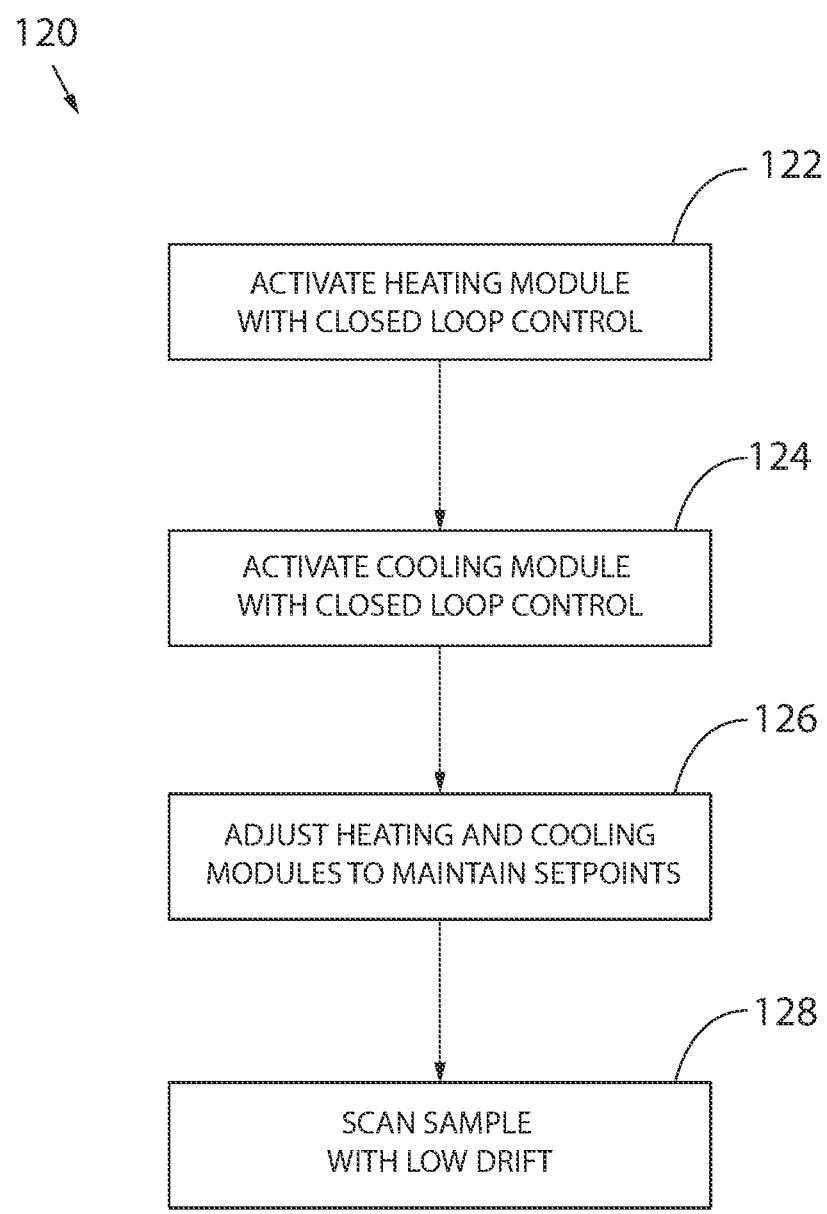
FIG. 13 is a flow chart illustrating operation of the low drift heater assembly in accordance with an aspect of the invention.

Referring now to FIG. 13, a flow chart 120 illustrating operation of the low drift heater assembly in accordance with an aspect of the invention. At step 122, the heating module 52 can be controlled in closed-loop control heating system. Then, at step 124, the cooling module 54 can be controlled in closed-loop control cooling system. Then, at step 126, the heating and cooling modules 52 and 54 can be adjusted by the controller 94 to maintain heating and cooling setpoints, respectively, with continuous power being supplied to the heater component 56. Finally, at step 128, with continuous power to the low thermal mass of the structure, a drift of the sample to be scanned can be maintained to less than 0.1 nanometers per minute in the z direction.

As a result, by simultaneously activating the heating and cooling modules 52 and 54, collectively having a low-thermal-mass, to achieve the heating and cooling set points 93 and 96, respectively, heat transfer along the axis 55 can be precisely controlled. The intrinsic low-thermal-mass of the system allows for rapid heating and cooling, with minimal power requirements, and with optimally-minimized heat-transfer to the AFM 30. This, in turn, ensures low drift of the sample to be scanned for more precise measurements. Moreover, due to the low-thermal-mass nature intrinsic to the system, multiple heater/cooler modules can be located in close proximity to one another and can have significant temperature differences between them (>200 degrees Celsius).

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. A low drift heater assembly of a metrology instrument for measuring a sample, the low drift heater assembly comprising:
   a structure for supporting the sample, the structure being configured to provide a low thermal mass that is operable to maintain a drift of the sample to less than 0.1 nanometers per minute.

2. The heater assembly of claim 1, wherein the structure comprises:
a heating module providing a heat source; and
a cooling module for cooling the heat source,
wherein the heating and cooling modules abut one another in axial alignment, and
wherein the heating and cooling modules are simultaneously active to control heat transfer through axial alignment to the sample.

3. The heater assembly of claim 2, wherein the heating and cooling modules are controlled in at least one closed-loop control system.

4. The heater assembly of claim 2, wherein the heat transfer is operable to heat the sample to at least 250 degrees Celsius in less than 5 seconds.

5. The heater assembly of claim 2, wherein the heat transfer is operable to maintain a temperature of the sample to within ±0.001 degree Celsius.

6. The heater assembly of claim 2, wherein a flat surface of the heating module directly abuts a flat surface of the cooling module with a thermal interface material disposed in between.

7. The heater assembly of claim 2, wherein the heating module comprises an electrically controlled heater component enclosed by an insulating structure.

8. The heater assembly of claim 7, wherein the insulating structure comprises a ceramic cylinder circumferentially surrounding the heater component and a ceramic disk separating the heater component from the cooling module.

9. The heater assembly of claim 8, wherein the ceramic cylinder and the ceramic disk include dissimilar ceramic materials.

10. The heater assembly of claim 2, wherein the cooling module includes a heat sink having a plurality of heat dissipating elements.

11. The heater assembly of claim 10, wherein the cooling module further includes first and second cooling blocks enclosing the heat sink, the first and second cooling blocks being thermally conductive, and wherein at least one of the first and second cooling blocks has a port providing liquid for cooling the heat sink.

12. The heater assembly of claim 11, further comprising a resilient seal circumferentially surrounding the heat sink between the first and second cooling blocks for sealing liquid in the cooling module.

13. The heater assembly of claim 2, further comprising a sample holder assembly configured to magnetically hold a sample disk containing the sample, wherein the sample holder assembly and the heating module abut one another, and wherein the sample holder assembly is in axial alignment with the heating and cooling modules, and wherein the drift is drift in z (orthogonal to a surface of the sample).

14. The heater assembly of claim 13, wherein the sample holder assembly and the heating and cooling modules have a combined weight of less than 3 grams.

15. A Scanning Probe Microscope (SPM), comprising:
a base;
a bridge structure coupled to and supported by the base;
a z-axis actuator coupled to the bridge structure;
a head assembly coupled to the z-axis actuator, the head assembly including an atomic force probe; and
a low drift heater assembly supported by the base, the low drift heater assembly including:
a sample holder assembly configured to magnetically hold a sample disk containing a sample to be scanned;
a heating module providing a heat source; and
a cooling module for cooling the heat source,
wherein the sample holder assembly and the heating and cooling modules are in axial alignment, and
wherein the heating and cooling modules are simultaneously active to control heat transfer through the axial alignment to the sample to be scanned.

16. The SPM of claim 15, wherein the heating and cooling modules are controlled in closed-loop control systems.

17. The SPM of claim 15, wherein the heat transfer is operable to heat the sample to be scanned to at least 250 degrees Celsius in less than 5 seconds.

18. The SPM of claim 15, wherein the heat transfer is operable to maintain a temperature of the sample to be scanned to within ±0.001 degree Celsius.

19. A low drift heating method for a metrology instrument, the method comprising:
providing a heating module for generating a heat source;
providing a cooling module for cooling the heat source;
abutting the heating and cooling modules to one another in axial alignment; and
simultaneously activating the heating and cooling modules to control heat transfer through the axial alignment to a sample to be scanned.

20. The low drift heating method of claim 19, further comprising controlling the heating and cooling modules in at least one closed-loop control system.

* * * * *